United States Patent [19]

Johnson

[11] 3,755,632

[45] Aug. 28, 1973

[54] APPARATUS FOR SIMULTANEOUSLY JOINING AND TESTING CONDUCTORS

[75] Inventor: Paul Johnson, Lakewood, Colo.

[73] Assignee: A. P. C. Industries, Inc, Mineral Wells, Tex.

[22] Filed: Aug. 17, 1971

[21] Appl. No.: 172,522

[52] U.S. Cl. .......... 179/175.3

[51] Int. Cl. .......... H04b 3/46

[58] Field of Search .......... 140/105, 113; 179/175, 175.1 R, 175.11, 175.3, 175.25; 324/60 C

[56] References Cited

UNITED STATES PATENTS

| | | | |
|---|---|---|---|
| 3,551,803 | 12/1970 | Ray | 179/175.3 |
| 3,559,698 | 2/1971 | Smith | 140/105 |
| 850,064 | 4/1907 | Shoemaker | 324/60 C |

*Primary Examiner*—Kathleen H. Claffy
*Assistant Examiner*—Douglas W. Olms
*Attorney*—Wm. T. Wofford et al.

[57] ABSTRACT

Method and apparatus for splicing telephone cable conductors characterized by the steps of crimping a connector means about the ends to be joined together and simultaneously testing the spliced conductor for electrical defects. Also disclosed are specific elements of the apparatus such as a bridge circuit for comparing the capacitance of the spliced wire pair that is being tested with that of a reference wire pair that is similar in character and traverse and is known to be free of the electrical defects.

10 Claims, 2 Drawing Figures

INVENTOR
Paul Johnson
BY
Wofford, Felsman & Fails
ATTORNEYS

APPARATUS FOR SIMULTANEOUSLY JOINING AND TESTING CONDUCTORS

BACKGROUND OF THE INVENTION:

1. Field of the Invention

This invention relates to the splicing of telephone cable conductors.

2. Description of the Prior Art

Telephone cables often contain hundreds of conductor pairs. It is frequently necessary to splice such wire pairs; either in incorporating new factory wire pairs into the telephone system or in making "throws"; that is, changing a group of wire pairs from one cable to another cable for more efficient telephone service. Such splicing may be done manually with hand tools or semi-automatically with powered portable cable splicer tools that have been recently developed. In the prior art methods and apparatus, the conductors were spliced together at one time. At a later time, mediately or immediately following the splicing operation, the conductors were individually tested with a separate piece of test equipment. Thus, the prior art methods have required two separate operations and two separate pieces of equipment. Moreover, if the testing was done at a later time, the tools for correcting any defect found in the wire pair would not be available to the repairman. Consequently, if a defect were found, another round of the individual operation of splicing and the separate operation of testing would be required.

Accordingly, it can be seen that the prior art methods and apparatus required a multi-step process that was inefficient and time consuming.

DESCRIPTION OF PREFERRED EMBODIMENTS

Figures 1, 2:
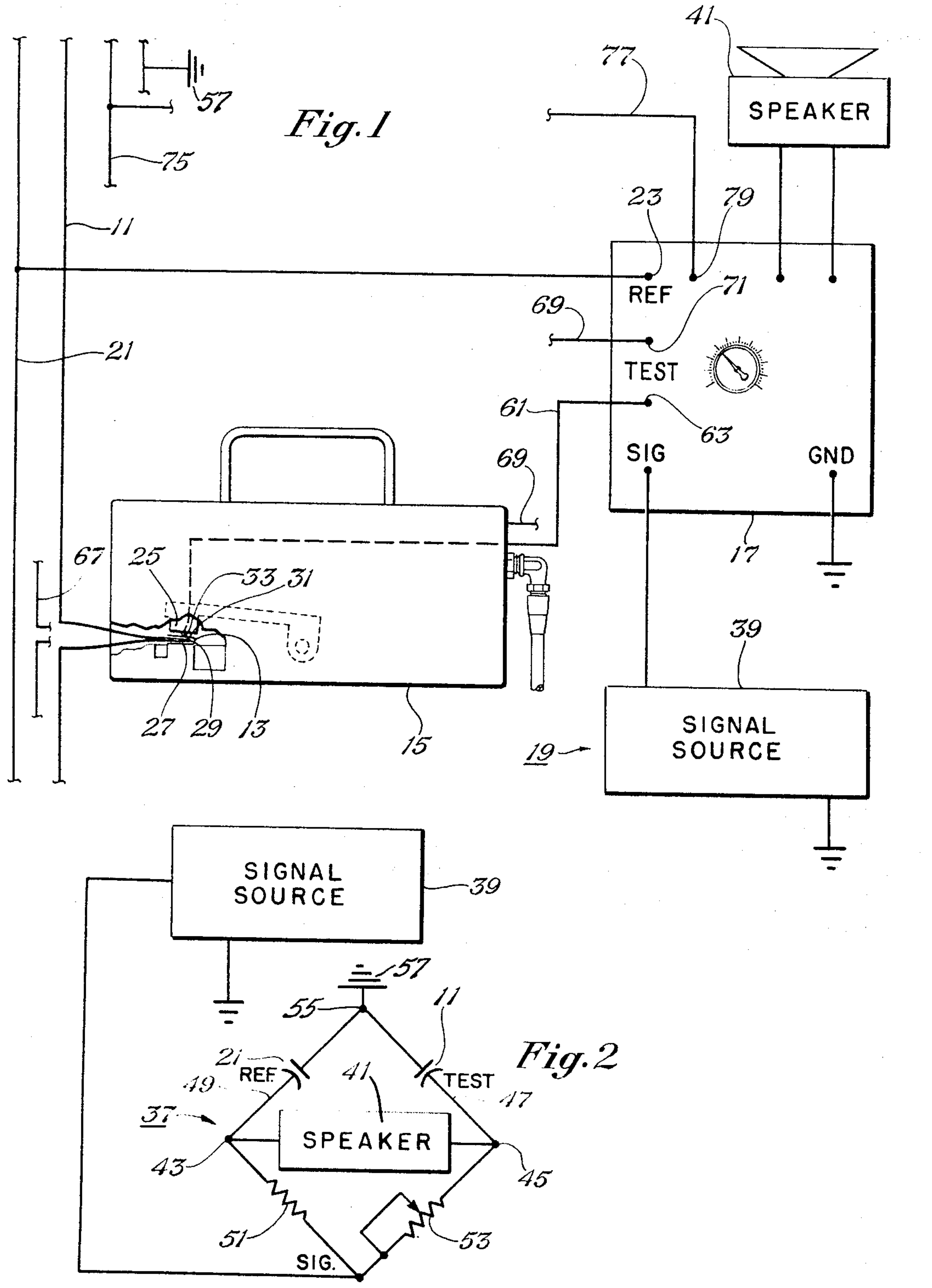
FIG. 1 is a partly schematic functional diagram illustrating one embodiment of this invention.
FIG. 2 is an electrical schematic diagram illustrating the comparison means employed in the embodiment of FIG. 1.

It is an object of this invention to provide method and apparatus for simultaneously splicing and testing telephone cable conductors such as a wire pair, obviating the disadvantages of the prior art methods and apparatus.

The primary object of this invention, as well as other objects, will become more clearly apparent from the following descriptive matter taken in conjunction with the drawings.

Referring to FIG. 1, there is illustrated a conductor 11 to be spliced and checked, connector means 13 for effecting a splice, crimping means 15 for crimping the connector means 13 about the ends of the conductor 11, balance tester means 17 for testing the capacitive balance of the conductor 11 against a reference conductor 21, and monitor means 19 for effecting an apprisal signal when there is an imbalance, or defect.

The conductor 11 may comprise a wire defining an electrically continuous path along its length, although not a complete electrical circuit. As indicated, in the art of telephony, the conductor 11 will ordinarily comprise a wire pair that are coextensive in length and offer a capacitance that may be checked in a Wheatstone bridge type circuit against a reference capacitance. Telephone cables have a severe problem in this area of splicing and testing, and the problem will be discussed with respect to wire pairs in a telephone cable, although the ends of only the single conductor 11 are fully illustrated in FIG. 1 for clarity.

A reference conductor 21 is similar to the conductor 11 in character and traverse and is known not to have the defect or defects for which the conductor 11 is being checked. By character is meant parameters that affect capacitance; for example, diameter, material of construction, and the like. By traverse is meant parameters such as length and environments through which the conductors are routed. Where the conductor 11 comprises a wire pair in a telephone cable, a reference wire pair; ordinarily, a twisted wire pair; that has been previously checked is employed and connected with respective reference terminals 23 and 79 on the balance tester means 17.

The connector means 13 may comprise any of the conventionally employed connectors. The connector may be open at each end for insertion of respective ends of the conductor, or open at only one end for insertion of both ends of the conductor in the same end of the connector. As illustrated, the connector means 13 is a connector of the Western Electric "B" type. Ordinarily, the connectors which are employed will have an inner, electrically conductive envelope that may be crimped about the ends of the conductor to hold the ends and form an electrically continuous circuit path; and will have an outer insulating envelope. The insulating envelope may comprise a nonconducting plastic like the polyolefins.

The crimping means 15 may comprise any of the crimping devices conventionally employed. It may be a hand operated crimping device resembling a pair of pliers. As illustrated, it is an automatic crimping device such as the "Pair-A-Matic." One satisfactory and typical automatic crimping device is described and claimed in U. S. Pat. No. 3,559,698. Since the crimping means are conventional and do not, per se, form a part of this invention they do not need further detailed description herein. It is sufficient to note that a hammer 25 is moved toward an anvil 27 to crimp the connector means 13 about the ends 29 and 31 of the conductor.

In any event, the crimping means 15 has a probe means 33 for effecting an electrical connection with the conductive envelope of the crimped connector means 13 and the ends 29 and 31 therewithin. The probe means 33 may comprise any type probe which will effect an electrical connection with the conductor ends 29 and 31 that is sufficient to measure capacitance of the conductor 11 with respect to the reference conductor 21. For example, capacitive or inductive probes may be employed. As illustrated, the probe means 33 comprises a sharp blade, or needle, that is carried by the hammer 25 of the crimping means 15 and pierces the insulating envelope to make direct electrical contact with the conductive envelope of the connector means 13. Other embodiments may employ connector means 13 with both ends open and pneumatically operated probes which enter the rear open end of the connector to make electrical contact without penetrating the insulating envelope. Such pneumatically operated probes are extended in the open end to make electrical contact as the connector is crimped about the conductor ends 29 and 31 and enables simultaneously testing the conductor, as will be described in more detail hereinafter.

The balance tester means 17 is connected with the probe means 33; and has a sensitive comparison means for comparing the conductor 11 with the reference conductor 21. Specifically, the sensitive comparison means comprises a bridge circuit 37, FIG. 2, such as employed in the Murphy Speed Tester, and a test set such as the 76–C test set. The balance tester means 17 has, as indicated hereinbefore, one or more reference terminals 23 and 79 for connecting with reference conductor 21 or conductors 21 and 75. Preferably, the balance tester means 17 also has terminals facilitating connection with the elements of the monitor means and electrical common, or ground; as well as test terminals for connection with the electrical conductors from the probe means 33 in the crimping means 15.

The monitor means 19 is connected with the comparison means such as the bridge circuit 37, FIG. 2. The monitor means 19 is adapted to effect an apprisal signal when a defect is detected by the comparison means. As illustrated, the monitor means comprises a signal source 39 and an apprisal means for effecting an apprisal signal responsive to the oscillatory signal put out by the siganl source 39. Specifically, the signal source 39 comprises a tone source such as the Buzy-Boy, or 76–C test set; and the apprisal means comprises a speaker means such as speaker 41 for effecting an audible apprisal signal responsive to capacitive imbalance of the conductor 11 in either direction with respect to the reference conductor 21. As illustrated in FIG. 2, the speaker 41 is connected with the terminals 43 and 45 in the bridge circuit 37 so as to effect an audible signal when the tone signal from the signal source 39 is impressed thereacross. The tone signal may be impressed thereacross by the conductor 11 having a capacitance that is higher or lower than that of the reference conductor 21. The conductor 11 and the reference conductor 21 are illustrated as capacitors in respective legs 47 and 49 of the bridge circuit 37. In accordance with usual practice, the bridge circuit 37 also has a resistor 51 and a balancing potentiometer 53 for conventionally balancing the bridge circuit. The terminal 55 is connected with electrical common, or ground 57. It is readily apparent that the conductor 11 and the reference conductor 21 each comprise a capacitor when they comprise respective wire pairs. If desired, a reference capacitance which simulates the character and traverse of reference conductor 21 may be employed. If a single conductor 11 and a single reference conductor 21 are being employed, however, their respective capacitance is measured with respect to a ground such as an electrical common 57 that has similar traverse.

In operation, the ends 29 and 31 of conductor 11 are emplaced within the connector means 13. The crimping means 15 is operated to crimp the connector means 13 about the ends 29 and 31 so as to effect an electrically continuous connection. In the same simultaneous operation with the crimping, the spliced conductor 11 is tested for one or more of: (1) a discontinuity either at the connector means or elsewhere in the conductor, (2) capacitive imbalance, (3) connection to any electrical ground at any point along the conductor 11, and (4) short circuits to another conductor at any point therealong. Specifically, as the hammer 25 crimps the connector means 13 abut the ends 29 and 31, the probe means 33 makes electrical contact with the respective ends 29 and 31 via the conductive envelope of the connector means 13. The electrical connection from the probe means 33 extends, via conductor 61 and test terminal 63, to the balance tester means 17. As can be seen clearly in FIG. 2, if the conductor 11 is capacitively balanced with the reference conductor 21, which has been previously connected with the reference terminal 23 of the balance tester 17, there will be no output across the speaker 41, since the bridge will have been balanced with the balancing potentiometer 53. In the event that one or more of the defects delineated immediately hereinbefore is detected, as denoted by a capacitive imbalance of the conductor 11 in either direction with respect to the reference conductor 21, there will be passage of the oscillatory signal such as a tone from the signal source 39 through leg 47 or leg 49 of the bridge circuit 37 and through speaker 41. The speaker 41, which may be in the form of a headset, gives an audible signal that is detectable by the repairman to denote the presence of a defect. The repairman then makes the correction in a conventional manner, as by replacing the defective conductor 11, or making an electrically continuous splice via the connector means 13. In any event, there has been a simultaneous splicing and testing of the conductor, obviating the time consuming separate testing; whether or not the additional multi-step correction described hereinbefore is required.

Where a wire pair are to be tested, the second wire 67 has its ends prepared and emplaced within a connector means, similarly as described with respect to conductor 11. The crimping means 15 has a second probe means (not shown) and second conductor 69 running from the second probe means to the second test terminal 71 of the balance tester 17. The conductor 69 is shown discontinuous in FIG. 1 so as not to obscure the operation of the invention with respect to the single conductor 11. When a second wire 67 is employed, a second reference wire 75 is employed and is connected via conductor 77 with a second reference terminal 79. When a wire pair have their capacitance checked against the capacitance of a reference wire pair, the wire pair are also tested for improper connection with another wire pair. As described with respect to the reference conductor 21, the reference wire pair are similar in character and traverse to the wire pair to be spliced and have beeh previsouly checked for the absence of a defect for which the spliced wire pair are being checked.

The materials conventionally employed in this art may be employed herein and no special new materials need be used.

The respective elements which are described herein are useful in testing for the defects delineated herein. Other equivalent elements may be substituted therefor, either in checking for the defects delineated herein, or in checking for other defects which are well known in this art.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A method for joining ends of a telephone cable conductor together to form a splice intermediate the ultimate contacts connected via the conductor comprising:

a. emplacing the two ends of the conductor within a connector means for retaining the ends together and forming an electrically continuous circuit path at the splice;

b. crimping said connector means about said ends so as to effect said electrically continuous circuit path at said splice; and c. in the same simultaneous operation with said crimping of said connector means, testing the spliced conductor effected by joining said ends by a capacitance test that inherently tests for one or more of:

i. a discontinuity either at the connector means or elsewhere in said conductor, ii. improper capacitance, iii. connection to electrical ground at any point along said conductor, and iv. short circuits to another conductor at any point therealong.

2. The method of claim 1 wherein said testing of said spliced conductor comprises comparing its capacitance with a reference capacitance.

3. The method of claim 2 wherein said reference capacitance comprises the capacitance of a reference conductor similar to said conductor both in character and traverse and known to be free of the defect for which said conductor is being tested.

4. A method for joining together ends of a plurality of at least two telephone cable conductors forming a respective wire pair to form respective splices intermediate the ultimate respective contacts connected via the plurality of conductors comprising:

a. emplacing the two ends of each of said conductors within respective connector means for retaining the respective ends of respective conductors together and forming an electrically continuous circuit path at each splice;

b. crimping respective said connector means about respective said ends so as to effect said electrically continuous circuit path at each said splice; and c. in the same simultaneous operation with said crimping of respective said connector means, testing the spliced plurality of conductors effected by joining respective pairs of said ends by comparing the capacitance of said plurality of conductors forming a respective wire pair with a pair of reference capacitances formed by a similar wire pair such that both said conductors in said respective wire pair are simultaneously spliced and tested.

5. Apparatus for joining ends of a telephone cable conductor to form a spliced conductor intermediate the ultimate contacts connected via the spliced conductor and simultaneously testing the spliced conductor comprising:

a. crimpable connector means for retaining the ends together and forming an electrically continuous path through a splice formed when said crimpable connector means are crimped about the ends of said conductor;

b. crimping means for crimping said connector means about said ends; said crimping means having probe means for effecting an electrical connection with a portion of said connector means and said ends therewithin; said probe means being disposed so as to automatically effect an electrical connection with said portion of said connector means and said ends therewithin when said crimping means crimps said crimpable connector means about said ends;

c. balance tester means for testing said conductor; said balance tester means being connected with said probe means and having a reference terminal for connecting with a reference capacitance; said balance tester means having sensitive comparison means for comparing said conductor with said reference capacitance; and d. monitor means connected with said comparison means and adapted to effect an apprisal signal when a defect is detected by said comparison means; such that when a reference capacitance is connected wtth said balance tester means and the ends of said conductor inserted within said connector means, said connector means may be crimped about said ends and said conductor is spliced and tested electrically with respect to said reference capacitance substantially simultaneously.

6. The apparatus of claim 5 wherein said reference capacitance is a conductor similar in character and traverse to said telephone cable conductor and known not to have any defect for which said telephone cable conductor is tested.

7. The apparatus of claim 6 wherein said monitor means comprises a source of an oscillatory signal and an apprisal means that is responsive to said oscillatory signal; said comparison means comprises a bridge circuit capable of comparing capacitance of said conductor with said reference capacitance; and said apprisal means effects an apprisal signal that is perceivable by a human; whereby said conductor can be checked for one or more of:

a. a discontinuity either at the connector means or elsewhere in said conductor;

b. capacitive imbalance;

c. connection to electrical ground at any point along said conductor; and d. short circuits to another conductor at any point therealong.

8. The apparatus of claim 7 wherein said oscillatory signal is a tone signal and said apprisal means comprises a speaker means connected across said bridge circuit so as to emit an audible apprisal signal in response to capacitive imbalance of said conductor in either direction with respect to said reference capacitance.

9. The apparatus of claim 5 wherein said probe means comprises a sharp electrically conductive needle means for penetrating through an insulating covering of said connector means to make an electrical connection with an electrical conductor that is connectable with said ends of said conductor when crimped properly thereabout.

10. Apparatus for joining ends of a telephone wire pair to from a spliced wire pair intermediate the ultimate contacts connected via the spliced wire pair and simultaneously testing the spliced wire pair comprising:

a. crimpable connector means for retaining the respective ends of the respective wires of said wire pair together and forming electrically continuous paths through respective splices formed when each said crimpable connector means are crimped about the respective ends of the wires of said wire pair; said connector means being adapted for splicing four ends, two each respectively of said wire pair;

b. crimping means for crimping said respective connector means about respective said ends; said crimping means having two respective probe means for effecting electrical connection with the ends of each respective wire of said wire pair so as to connect said wire pair with a balance tester means; each said probe means being disposed so as to automatically effect an electrical connection with a portion of each said connector means and said ends therewithin when said crimping means crimps respective said crimpable connector means about said ends;

c. balance tester means for testing said wire pair; said balance tester means being connected with each said probe means and having a pair of respective reference terminals; a pair of reference capacitances comprising a pair of reference wires having size, traverse and extent similar to said wire pair; said reference capacitances being connected with said balance tester means at said respective reference terminals for comparison of the capacitive balance between said wire pair and said respective reference capacitances; said balance tester means having respective sensitive comparison means for comparing said wire pair with respective said reference capacitances; and d. monitor means connected with said comparison means and adapted to effect an apprisal signal when a defect is detected by said comparison means; such that each said wire in each said wire pair is simultaneously tested when its respective said crimping means is crimped about its ends for forming its said splice, thereby obviating the necessity for a subsequent test.

* * * * *